United States Patent
Tsirkin et al.

(10) Patent No.: US 11,620,149 B2
(45) Date of Patent: Apr. 4, 2023

(54) SAFE ENTROPY SOURCE FOR ENCRYPTED VIRTUAL MACHINES

(71) Applicant: Red Hat, Inc., Raleigh, NC (US)

(72) Inventors: Michael Tsirkin, Westford, MA (US); Karen Lee Noel, Westford, MA (US)

(73) Assignee: Red Hat, Inc., Raleigh, NC (US)

( * ) Notice: Subject to any disclaimer, the term of this patent is extended or adjusted under 35 U.S.C. 154(b) by 352 days.

(21) Appl. No.: 16/911,400

(22) Filed: Jun. 25, 2020

(65) Prior Publication Data

US 2021/0406054 A1 Dec. 30, 2021

(51) Int. Cl.
*G06F 9/455* (2018.01)
*G06F 21/60* (2013.01)

(52) U.S. Cl.
CPC ........ *G06F 9/45558* (2013.01); *G06F 21/602* (2013.01); *G06F 2009/45583* (2013.01); *G06F 2009/45587* (2013.01)

(58) Field of Classification Search
CPC .............. G06F 9/45558; G06F 21/602; G06F 2009/45583; G06F 2009/45587; G06F 21/74; G06F 21/78
See application file for complete search history.

(56) References Cited

U.S. PATENT DOCUMENTS

| | | | |
|---|---|---|---|
| 7,664,269 B2 | 2/2010 | Wood et al. | |
| 9,460,276 B2 * | 10/2016 | Tanikawa | G06F 21/30 |
| 9,548,862 B1 | 1/2017 | Potter | |
| 9,748,127 B2 | 8/2017 | Doane et al. | |
| 2009/0282266 A1 * | 11/2009 | Fries | G06F 21/602 713/193 |

(Continued)

FOREIGN PATENT DOCUMENTS

WO 2017030745 A1 2/2010

OTHER PUBLICATIONS

Mengyuan Li et al., "Exploiting Unprotected I/O Operations in AMD's Secure Encrypted Virtualization," https://www.usenix.org/conference/usenixsecurity19/presentation/li-mengyuan, Aug. 14-16, 2019, 28th USENIX Security Symposium, Santa Clara, CA USA, pp. 1256-1272, 17 pages.

(Continued)

*Primary Examiner* — Robert B Leung
*Assistant Examiner* — Bruce S Ashley
(74) *Attorney, Agent, or Firm* — Womble Bond Dickinson (US) LLP

(57) ABSTRACT

Systems and methods for ensuring that data received from a virtual device is random are provided. A processing device may be used to generate, by a virtual device executing on a hypervisor, data intended for a virtual machine (VM) having a guest memory that includes one or more encrypted pages and one or more unencrypted pages. Data written to an encrypted page of the guest memory by the VM is encrypted using an encryption key assigned to the VM and information read from the encrypted page by the VM is decrypted using the encryption key. The hypervisor may write the data to the encrypted page, wherein the data is not encrypted by the encryption key assigned to the VM because it is written by the hypervisor. The VM reads the data from the encrypted page as randomized data because it cannot be properly decrypted by the encryption key.

14 Claims, 6 Drawing Sheets

(56) References Cited

U.S. PATENT DOCUMENTS

2014/0101459 A1* 4/2014 Debout ................ G06F 3/0619
713/190
2014/0109070 A1 4/2014 Mahamuni et al.
2015/0106952 A1* 4/2015 Bacher ................ G06F 9/45558
726/26

OTHER PUBLICATIONS

Cedric Dufour, "How to ensure entropy and proper random numbers generation in virtual machines," https://www.exoscale.com/syslog/random-numbers-generation-in-virtual-machines/, Aug. 8, 2019, 13 pages.

Robert Buhren et al., "Insecure Until Proven Updated: Analayzing AMD SEV's Remote Attestation," arXiv:1908.11680v2 [cs.CR], Sep. 2, 2019, 13 pages.

* cited by examiner

SAFE ENTROPY SOURCE FOR ENCRYPTED VIRTUAL MACHINES

TECHNICAL FIELD

Aspects of the present disclosure relate to virtual machines (VMs), and more particularly, to preventing unauthorized access to guest memory of VMs.

BACKGROUND

Hypervisors abstract the physical resources of a computing device such as physical processing devices (e.g., processors, CPUs, etc.) and physical memory (e.g., RAM) into virtual resources which can be utilized to deploy multiple VMs. The hypervisor may manage and assign these virtual resources to each VM running on the computing device. Hypervisors also facilitate communication between virtual devices (such as entropy sources) and VMs, and provide access to the guest memory of VMs. Secure encrypted virtualization (SEV) is a technology that is designed to isolate VMs from the hypervisor and other code that may coexist on the physical host at the hardware level. In this way, SEV may protect VMs from physical threats as well as protect them from other VMs and even the hypervisor itself. SEV is useful in a variety of applications. For example, certain customers of a cloud service may want to secure their VM-based workloads from the cloud administrator to keep their data confidential and minimize their exposure to bugs in the cloud provider's infrastructure.

BRIEF DESCRIPTION OF THE DRAWINGS

The described embodiments and the advantages thereof may best be understood by reference to the following description taken in conjunction with the accompanying drawings. These drawings in no way limit any changes in form and detail that may be made to the described embodiments by one skilled in the art without departing from the spirit and scope of the described embodiments.

DETAILED DESCRIPTION

Figure 1A:
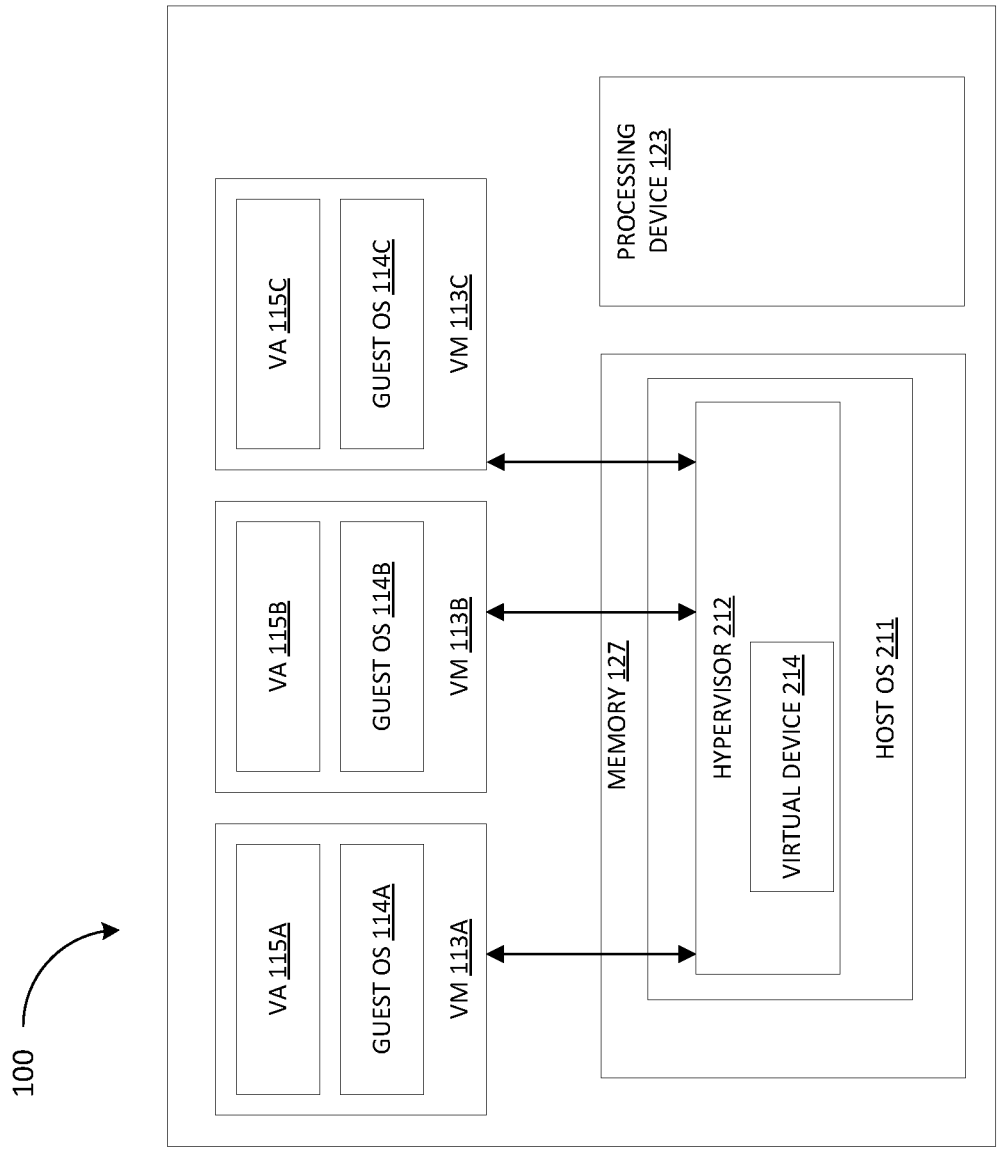
FIG. 1A is a block diagram that illustrates an example computing device, in accordance with some embodiments of the present disclosure.

Providing virtual devices implemented in the hypervisor access to guest memory of a VM poses an inherent security issue. For example, confidential data of the guest VM may be vulnerable to snooping by unauthorized users or software (e.g., using hardware probing). SEV addresses this by allowing VMs to designate certain pages of guest memory as encrypted (private) and other pages of guest memory as unencrypted (shared). Guest memory pages designated as shared may be used for communication between a VM and the hypervisor as well as virtual devices executing on the hypervisor, for example. Guest memory pages designated as private are encrypted using an encryption key assigned to the VM and are for the exclusive use of the VM for storing confidential data. However, there are still numerous ways that attackers may attempt to compromise the security of VMs that utilize SEV.

One type of attack involves virtual devices that are dedicated entropy sources. As used herein, entropy refers to the randomness collected by an operating system or application for use in cryptography or other uses that require random data. This randomness is often collected from hardware sources (e.g., variance in fan noise or hard disk drive (HDD)), including pre-existing sources such as mouse movements as well as dedicated randomness generators. A lack of entropy can have a negative impact on performance and security. Dedicated entropy sources, such as random number generators, provide randomized data (e.g., entropy) to a VM's operating system on request. This is particularly useful when a pre-existing source such as a keyboard or mouse cannot generate sufficient entropy on their own. However, validating whether data provided by a dedicated entropy source is actually random or not is difficult. Because of this, a hypervisor can deceive a VM by supplying predictable data in the shared memory when the VM is expecting random data. In the cryptography context, if the VM's operating system is expecting random data, and predictable data is provided instead, an attacker could gain access to sensitive information.

The present disclosure addresses the above-noted and other deficiencies by using a processing device to generate, by a virtual device executing on a hypervisor, data intended for a virtual machine (VM) having a guest memory that includes one or more encrypted pages and one or more unencrypted pages. The VM may be expecting random data from an entropy source, for example, but an attacker may attempt to use the hypervisor to pass predictable data to the VM and gain access to sensitive information. The processing device may encrypt information written to an encrypted page of the guest memory by the VM itself using an encryption key assigned to the VM, and decrypt information read from the encrypted page by the VM using the encryption key. The hypervisor may write the data to an encrypted page of guest memory instead of an unencrypted page normally used for communication between the VM and the hypervisor, and as such, the processing device may not encrypt the data with the encryption key assigned to the VM because it is written by hypervisor (not the VM). When the VM attempts to read the data from the encrypted page, the processing device may attempt to decrypt the data using the encryption key assigned to the VM. Because the data was never encrypted using the encryption key in the first place, the processing device may improperly decrypt the data, thereby scrambling (e.g., randomizing) the data such that the data is read as random data by the VM. In this way, data provided to a VM by the hypervisor is guaranteed to have a certain level of randomness that the hypervisor cannot account for, and attacks by the hypervisor that use predictable data to gain access to sensitive information may be prevented.

FIG. 1A is a block diagram that illustrates an example computing device 100. Computing device 100 may include hardware such as processing device 123 (e.g., processors, central processing units (CPUs)), memory 127 (e.g., random access memory (RAM), storage devices (e.g., hard-disk drive (HDD), solid-state drive (SSD), etc.), and other hardware devices (e.g., sound card, video card, etc.). In some embodiments, memory 127 may be a persistent storage that is capable of storing data. A persistent storage may be a local storage unit or a remote storage unit. Persistent storage may be a magnetic storage unit, optical storage unit, solid state storage unit, electronic storage units (main memory), or similar storage unit. Persistent storage may also be a monolithic/single device or a distributed set of devices. Memory 127 may be configured for long-term storage of data and may retain data between power on/off cycles of the computing device 100. The computing device 100 may comprise any suitable type of computing device or machine that has a programmable processor including, for example, server computers, desktop computers, laptop computers, tablet computers, smartphones, set-top boxes, etc. In some examples, the computing device 100 may comprise a single machine or may include multiple interconnected machines (e.g., multiple servers configured in a cluster). Memory 127 may include host operating system (OS) 211, which may manage the execution of other components (e.g., software, applications, etc.) and/or may manage access to the hardware (e.g., processors, memory, storage devices etc.) of the computing device 100.

The host OS 211 may include a hypervisor 212, which may also be known as a virtual machine monitor (VMM). In the example shown, hypervisor 212 may be a component of the host OS 211. In another example, hypervisor 212 may run on top of host OS 211, or may run directly on host hardware without the use of a host OS 211. Hypervisor 212 may manage system resources, including access to processing device 123, memory 127, other storage devices (e.g., HDDs, SSDs), and/or other devices (e.g., sound cards, video cards, etc.). The hypervisor 212, though typically implemented in software, may emulate and export a bare machine interface to higher level software in the form of virtual processors and guest memory (virtual resources). Higher level software may comprise a standard or real-time operating system (OS), may be a highly stripped down operating environment with limited operating system functionality, and/or may not include traditional OS facilities, etc. For example, higher level software may be a network virtualization platform (not shown) such as the RedHat™ OpenStack™ virtualization platform. Hypervisor 212 may present other software (i.e., "guest" software) the abstraction of one or more virtual machines (VMs) that provide the same or different abstractions to various guest software (e.g., guest operating system, guest applications).

In some embodiments, a network virtualization platform (also referred to as a "virtualization management service") may also execute on the host OS 211. The network virtualization platform may use a consistent set of application programming interfaces (APIs) to abstract those virtual resources provided by the hypervisor 212 one step further into discrete pools that may be used to configure and deploy VMs (e.g., VMs 113) and virtual applications (e.g., VAs 115) that administrators and users may interact with directly. The network virtualization platform may include a deployment controller to handle creation of VMs 113 as well as provisioning of the VMs 113 with virtual applications 115. The deployment controller may also function to manage the operations of the virtual applications. For example, the network virtualization platform may utilize the deployment controller to create virtual switches (and a VM 113 for the switch to run on) as well as manage the operations of the virtual switch (e.g., configuring/modifying rules and groups, managing connections with other virtual network functions (VNFs) and handling diagnostic tasks). The VMs 113 may be isolated, in that they are not connected to any other device or component of computing device 100, whether virtual or otherwise.

VMs 113A-113C may execute on computing device 100 as described herein. In one embodiment, a VM 113 may be a software implementation of a machine (e.g., a software implementation of a computing device) that includes its own operating system (i.e. guest OS 114) and executes one or more virtual applications (VA) 115. A VA 115 may be an application program, application, or software such as a virtual network function. The hypervisor 212 may emulate the hardware (and other physical resources) to provide virtual resources which may be used by the VMs 113 to execute guest software/applications (e.g., VAs 115), as discussed in more detail herein. A VM 113 may be, for example, a hardware emulation, a full virtualization, a para-virtualization, and an operating system-level virtualization VM.

A VM 113 may execute a VA 115 (i.e. guest software) which may use an underlying emulation of the physical resources (e.g., virtual processors and guest memory—virtual resources). Both the VM 113 and the VA 115 may be configured and deployed by a network virtualization platform executing atop the host OS 211, as discussed above. The network virtualization platform, via the computing device 100, may provide administrators and users with the capability to virtualize a variety of functions (e.g., network functions).

Although one VA 115 is illustrated in a respective VM 113, a VM 113 may include multiple VAs 115 in other embodiments. In some embodiments, VAs 115 may be deployed and managed by a deployment controller (not illustrated in the figures) executing as part of a network virtualization platform.

Hypervisor 212 may also function to allow virtual devices such as virtual device 214 to execute thereon. For example, hypervisor 212 may provide for the emulation of virtual device 214. Emulated devices may be purely virtual devices that mimic real hardware, and allow a guest OS 114 to work with them using standard in-box drivers. The hypervisor 212 may facilitate communication between a virtual device 214 and the guest OS 114 of a VM 113 (e.g., the drivers thereof). More specifically, hypervisor 212 may map physical addresses to guest memory virtual addresses and provide direct memory access (DMA) address translation. In one example, the hypervisor 212 may map the physical addresses of a virtual device 214 to the virtual addresses of a VM 113 in a page table of the processing device 123. In another example, the guest memory of the VM 113 may be made available to the virtual device 214 in a page table of an input/output memory management unit (IOMMU) (not shown) by the hypervisor 212.

Although hypervisors have traditionally been trusted components, there are numerous use cases for a more secure model as discussed herein. Secure Encrypted Virtualization (SEV) is a technology that isolates VMs at a hardware level from the hypervisor and other code that may happen to coexist on the physical machine (e.g., computing device 100). SEV assigns individual VMs a unique encryption key (e.g., an advanced encryption standard (AES) key) that is used to automatically encrypt their sensitive data in pages designated as private (encrypted). Thus, when a component such as a hypervisor attempts to read guest memory of a VM, it is only able to see the encrypted bytes. An attacker without knowledge of the encryption key cannot decipher encrypted VM data that is stored in memory. The encryption key itself may be generated from a hardware random number generator and may be stored in dedicated hardware registers within processing device 123 where it cannot be directly read by software.

VMs must still execute their own tasks and communicate with outside entities via I/O however. This may include communication over a network link, with a storage server, or with other components, for example. SEV allows this communication using shared (unencrypted) memory pages. Any outgoing data that a VM desires to make available is placed into a shared page of memory, and any incoming data (e.g., from another VM or virtual device) must similarly be placed into a shared page. Because shared memory is not encrypted with the VM's assigned key, appropriate software encryption protocols like HTTPS may be used for security of I/O traffic on a shared memory page.

SEV allows VMs to control whether a memory page will be encrypted (private) or unencrypted (shared). This choice is done using the standard CPU page tables, and may be fully controlled by the VM. For example, VM 113A may mark selected pages of its guest memory as encrypted in its page table entries. In some embodiments, by setting a particular bit of a physical address to 1 in the page table entry (PTE), VM 113A may indicate that the page should be encrypted (i.e. a private page), causing accesses to that memory by the VM 113A to be automatically encrypted and decrypted by the AES engine in (e.g., a memory controller of) processing device 123. For memory pages marked as private, the processor 123 may encrypt data with the AES encryption key when it is written to the memory page (e.g., DRAM) by the VM 113A, and decrypt data using the AES encryption key when it is read by the VM 113A. However, if a component other than the VM 113A writes data to a memory page marked as private, the processing device 123 will not encrypt it with the VM 113A's assigned key. This feature allows VMs to mark selected pages of memory data they want to keep confidential (private), and others to be used for communication with other VMs or the hypervisor, for example. For security, SEV requires certain types of memory (including instruction pages and page tables) to always be private to protect the VM.

Figure 2:
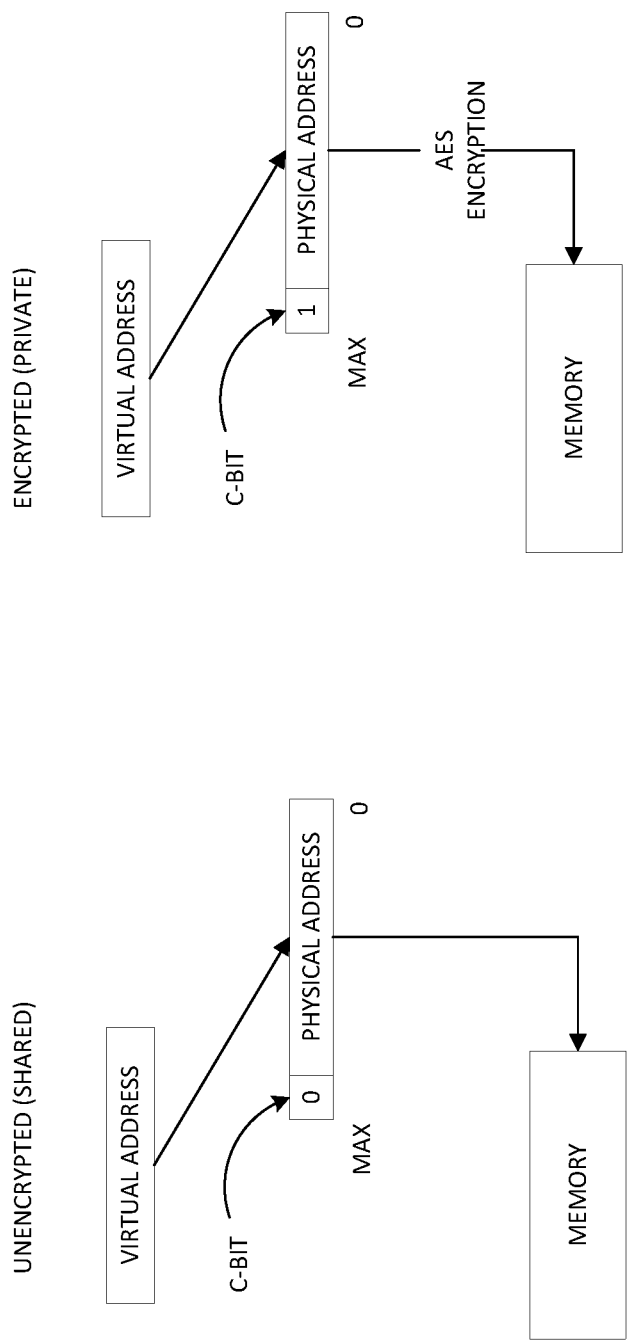
FIG. 2 is a block diagram that illustrates example encrypted and unencrypted guest memory pages, in accordance with some embodiments of the present disclosure.

FIG. 2 is a diagram illustrating unencrypted (shared) and encrypted (private) memory pages. SEV allows guest VMs to control whether a memory page is private or shared using an encrypted bit (also referred to as a C-bit) in the guest memory page tables. The location of the C-bit is implementation specific. As shown in FIG. 2, the C-bit may be the top physical address bit, however any appropriate bit of the memory page's physical address may be used. The C-bit may be set to zero to designate a shared memory page and set to 1 to designate a private memory page. In a typical VM, most pages are marked as private, and only select pages used for outside communication are marked as shared, however any appropriate number of pages may be marked as private and any appropriate number of pages may be marked as shared. In some embodiments, the encryption of data on a particular private page is performed using a 128-bit encryption key assigned to the VM and is based at least in part on the physical address of the particular private page.

As discussed herein, certain virtual devices may act as entropy sources. For example, the virtio-rng device is a random number generating (RNG) device that feeds RNG data to a VM's operating system, thereby providing fresh entropy for the VM on request. This may be particularly useful when a device such as a keyboard or a mouse is not enough to generate sufficient entropy on the VM. However, as discussed above, there is no way to validate that data supplied to a shared memory page of a VM is actually random, which may allow a hypervisor to deceive the VM by supplying predictable data in the shared memory.

Figure 1B:
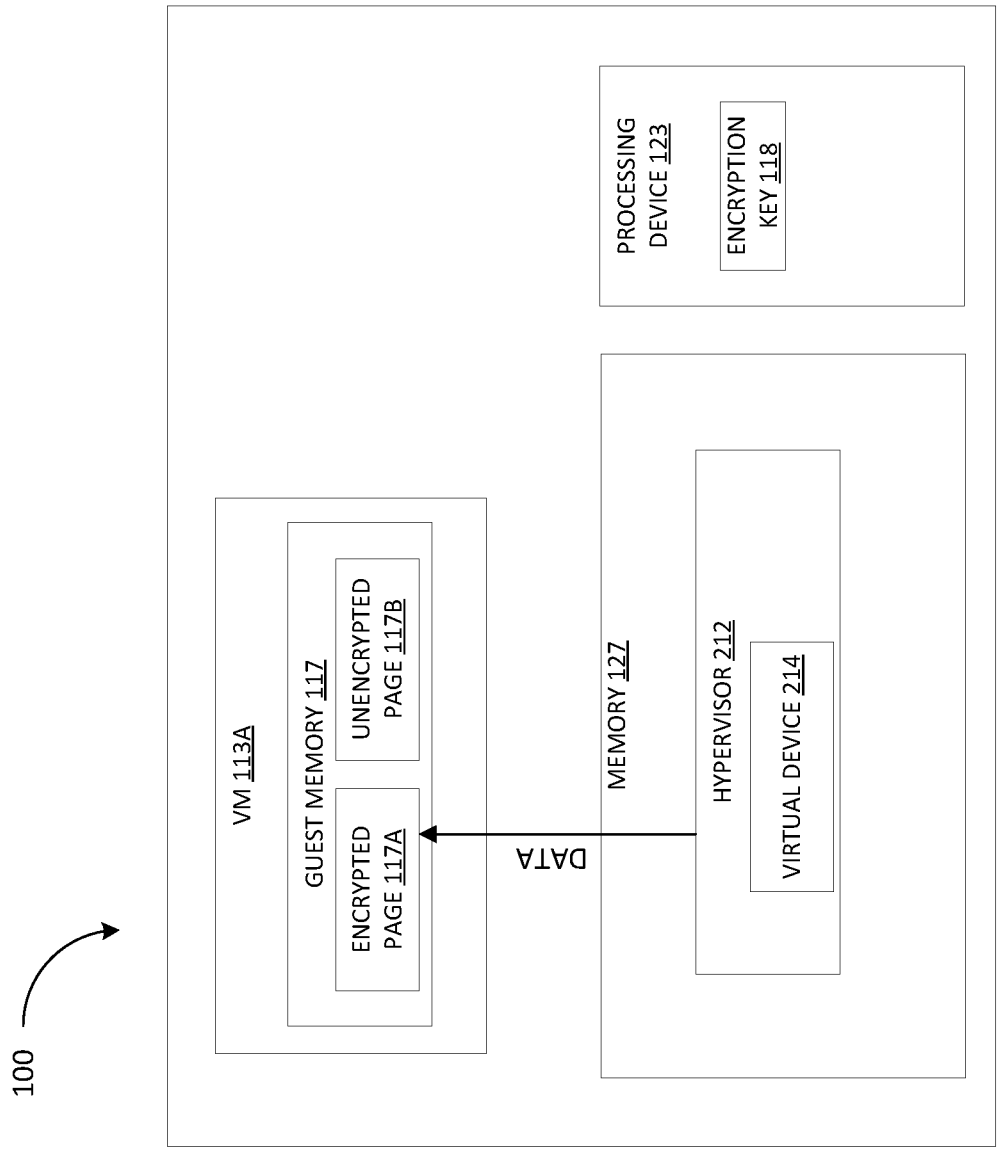
FIG. 1B is a block diagram that illustrates an example computing device, in accordance with some embodiments of the present disclosure.

Referring to both FIGS. 1A and 1B, in some embodiments, when a virtual device 214 acting as an entropy source generates data to write to VM 113A, it may do so via the hypervisor 212 that it is executing on. The virtual device 214 may be any appropriate entropy source, such as a random number generator (e.g., virtio-rng). The hypervisor 212 may initiate a request to write the data to guest memory 117 of the VM 113A. To ensure that the data is random, and not predictable data used as part of an attempt to access confidential information, the VM 113A may provide the hypervisor 212 with the address of an encrypted (private) page 117A of guest memory 117 in which the hypervisor 212 may write the data, instead of a shared memory page 117B. Because the hypervisor 212 is not authorized to write in a private page 117A, the processing device 123 does not encrypt the data that the hypervisor 212 writes in the private page 117A of guest memory 117 with the VM 113A's encryption key 118. As a result, the data that the hypervisor 212 writes in the private page 117A cannot be properly decrypted when the VM 113A attempts to read it. Stated differently, the hypervisor 212 may write in the private page of the VM 113A through a mapping with encryption disabled, and the VM 113A may subsequently attempt to read this data through a mapping with encryption enabled. When the VM 113A attempts to read the data, the processing device 123 attempts to decrypt the data using the encryption key 118 assigned to the VM 113A. Because the data was not encrypted with the encryption key 118 assigned to VM 113A in the first place however, an improper decryption results, wherein random data is generated as a result of the improper decryption. Stated differently, the data is scrambled as a result of the improper decryption. The improperly decrypted data cannot be distinguished from random noise by the VM 113A. This randomization of data due to the improper decryption ensures that data supplied by the hypervisor 212 is in fact random, and provides a level of randomization that hypervisor 212 cannot account for or predict. In this way, when a VM 113A requires entropy (e.g., expects random data), it can be protected from attackers that may use hypervisor 212 to attempt to deceive it using predictable data.

In some embodiments, the hypervisor 212 may be configured to write data to an encrypted page of guest memory using its own encryption key (not shown in the FIGS). Because the data that the hypervisor 212 writes in the private page 117A of guest memory 117 is encrypted using the hypervisor 212's encryption key, and not VM 113A's encryption key, it cannot be properly decrypted by the processing device 123 when the VM 113A attempts to read it. When the VM 113A attempts to read the data, the processing device 123 decrypts the data using the encryption key assigned to the VM 113A. Because the data was not encrypted with the encryption key assigned to VM 113A however, an improper decryption results, wherein random data is generated as a result of the improper decryption.

In some embodiments, the hypervisor 212 may initiate multiple requests to write data to the guest memory of the VM 113A, and attempt to deceive the VM 113A by supplying the same duplicative data in each of the multiple requests. To address this scenario, when the hypervisor 212 wishes to write the data for each of the multiple requests in guest memory, the VM 113A may provide the hypervisor 212 a different encrypted page for each request. Because encryption/decryption of data in SEV is based at least partially on the address of the memory page being written to, as discussed herein, the data of each write request will be improperly decrypted in a different manner owing to the different address of each different encrypted page in which the hypervisor 212 writes the data of a write request. In this way, VM 113A may achieve an additional level of randomization in scenarios involving multiple requests from the hypervisor 212 to access the VM 113's guest memory.

In some embodiments, to address scenarios in which the hypervisor 212 initiates multiple write requests with duplicative data in each, VM 113 may in addition to or as an alternative to providing different memory pages for each request, provide validation by checking whether the data in one or more of the multiple requests is duplicative. For example, VM 113 may perform validation checking to determine if the data in a threshold number of the requests is duplicative, and if so, deny the hypervisor 212 write access. In some embodiments, the VM 113 may seek another source of entropy upon denying the hypervisor 212 write access.

If the VM 113 is shut down, and a new VM is created, a new key is also generated for the newly created VM. Thus, even if the hypervisor 212 writes the same data before and after the guest VM 113 is shut down and the new guest VM is created, randomization of data will still be ensured because a new key is being used to decrypt the data. However, if VM 113 reboots (as opposed to being shut down), then no new encryption key is generated by processing device 123. Thus, if the hypervisor 212 writes the same data before and after the VM 113 is rebooted, the VM 113 may provide different addresses for each write as discussed herein. In some embodiments, because the VM 113 may be rebooted multiple times, the VM 113 may utilize a reboot counter, to determine when it is running out of encrypted memory page addresses to provide to the hypervisor. Upon reaching a threshold, the VM 113 may not send any memory page addresses to the hypervisor 212, and instead processor 123 may instruct the hypervisor 212 to zero-initialize all guest memory through a non-encrypted mapping, and the VM 113 may still read random data.

Figure 3:
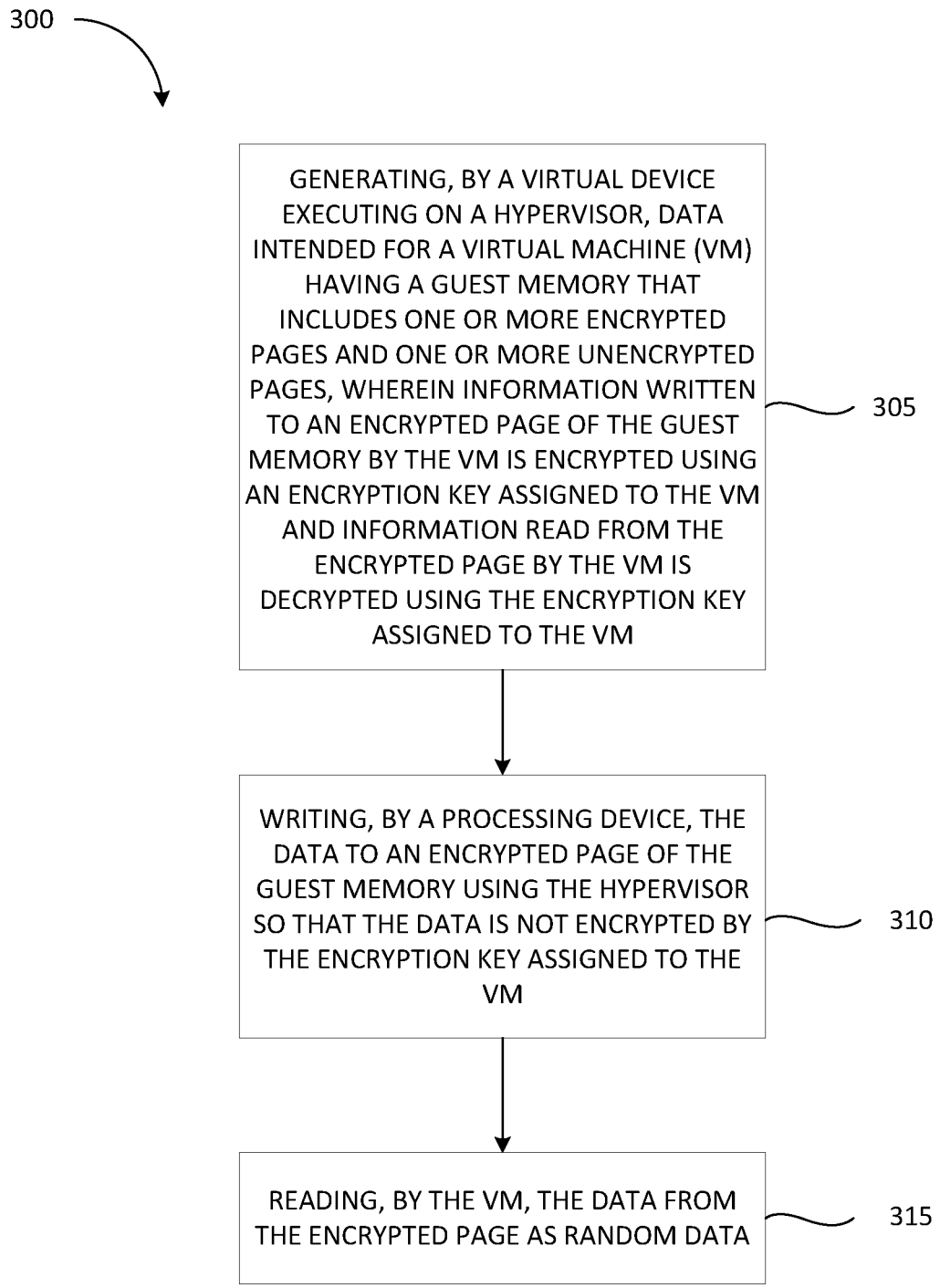
FIG. 3 is a flow diagram of a method for ensuring randomness of data provided to a VM, in accordance with some embodiments of the present disclosure.

FIG. 3 is a flow diagram of a method 300 for ensuring randomness of data written to guest memory of a VM, in accordance with some embodiments of the present disclosure. Method 300 may be performed by processing logic that may comprise hardware (e.g., circuitry, dedicated logic, programmable logic, a processor, a processing device, a central processing unit (CPU), a system-on-chip (SoC), etc.), software (e.g., instructions running/executing on a processing device), firmware (e.g., microcode), or a combination thereof. In some embodiments, the method 300 may be performed by a computing device (e.g., computing device 100 illustrated in FIGS. 1A and 1B).

With reference to both FIGS. 1A and 1B as well, the method 300 begins at block 305, where a virtual device 214 executing on the hypervisor 212 may generate data intended for a virtual machine (VM) 113A having a guest memory 117 that includes one or more encrypted pages 117A and one or more unencrypted pages 117B. Processing device 123 may encrypt data written to an encrypted page of the guest memory by the VM 113A using an encryption key assigned to the VM 113A and decrypt information read from the encrypted page by the VM using the encryption key. When a virtual device 214 acting as an entropy source generates data to write to VM 113A, it may do so via the hypervisor 212 that it is executing on. The virtual device 214 may be any appropriate entropy source, such as a random number generator (e.g., virtio-rng). The hypervisor 212 may initiate a request to write the data to guest memory 117 of the VM 113A. To ensure that the data is random, and not predictable data used as part of an attempt to access confidential information, the VM 113A may provide the hypervisor 212 with the address of an encrypted (private) page 117A of guest memory 117 in which the hypervisor 212 may write the data, instead of a shared memory page 117B.

At block 310, the hypervisor 212 may write the data to the encrypted page 117A of the guest memory 117 instead of an unencrypted page 117B. Because the hypervisor 212 is not authorized to write in a private page 117A, the processing device 123 does not encrypt the data that the hypervisor 212 writes in the private page 117A of guest memory 117 with the VM 113A's encryption key 118. As a result, the data that the hypervisor 212 writes in the private page 117A cannot be properly decrypted when the VM 113A attempts to read it. Stated differently, the hypervisor 212 may write in the private page of the VM 113A through a mapping with encryption disabled, and the VM 113A may subsequently attempt to read this data through a mapping with encryption enabled.

At block 315, the VM 113A may read the data from the encrypted page 117A as random data. More specifically, when the VM 113A attempts to read the data from the encrypted page 117A, the processing device 123 may attempt to decrypt the data using the encryption key 118. Because the data was never encrypted using the encryption key 118 in the first place, the processing device 123 may improperly decrypt the data, thereby scrambling (or, randomizing) the data such that the data is read as random data by the VM 113.A In this way, data provided to the VM 113A by the hypervisor 212 is guaranteed to have a certain level of randomness that the hypervisor 212 cannot account for, and attacks by the hypervisor 212 that use predictable data to gain access to sensitive information may be prevented.

Figure 4:
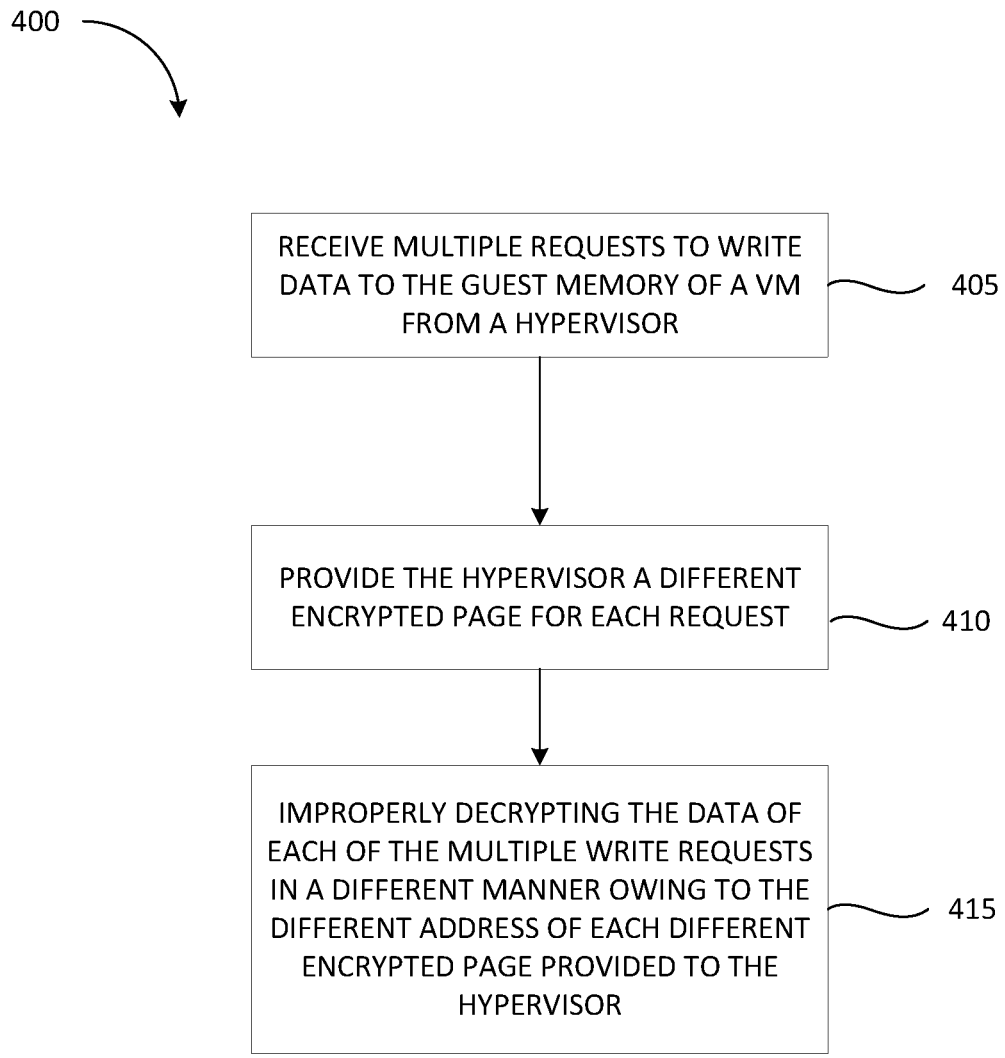
FIG. 4 is a flow diagram of a method for providing an additional level of randomization for data provided over multiple requests, in accordance with some embodiments of the present disclosure.

FIG. 4 is a flow diagram of a method 400 for providing an additional level of randomness in data written to guest memory of a VM, in accordance with some embodiments of the present disclosure. Method 400 may be performed by processing logic that may comprise hardware (e.g., circuitry, dedicated logic, programmable logic, a processor, a processing device, a central processing unit (CPU), a system-on-chip (SoC), etc.), software (e.g., instructions running/executing on a processing device), firmware (e.g., microcode), or a combination thereof. In some embodiments, the method 400 may be performed by a computing device (e.g., computing device 100 illustrated in FIGS. 1A and 1B).

At block 405, the hypervisor 212 may initiate multiple requests to write data to the guest memory 117 of the VM 113A, and attempt to deceive the VM 113A by supplying the same duplicative data in each of the multiple requests. To address this scenario, when the hypervisor 212 wishes to write the data for each of the multiple requests in guest memory, at block 410 the VM 113A may provide the hypervisor 212 a different encrypted page for each request. Stated differently, the VM 113A may provide the hypervisor 212 a different physical address for each request. Because encryption/decryption of data in SEV is based at least partially on the address of the memory page being written to, as discussed herein, at block 415 the data of each write request will be decrypted in a different manner by the processing device 123 owing to the different address of each different encrypted page in which the hypervisor 212 writes the data of a write request. In this way, VM 113A may achieve an additional level of randomization in scenarios involving multiple requests from the hypervisor 212 to access the VM 113A's guest memory.

In some embodiments, to address scenarios in which the hypervisor 212 initiates multiple write requests with duplicative data in each, VM 113A may in addition to or as an alternative to providing different memory pages for each request, provide validation by checking whether the data in one or more of the multiple requests is duplicative. For example, VM 113A may perform validation checking to determine if the data in a threshold number of the requests is duplicative, and if so, deny the hypervisor 212 write access. In some embodiments, the VM 113A may seek another source of entropy upon denying the hypervisor 212 write access.

If the VM 113A is shut down, and a new VM is created, a new key is also generated for the newly created VM. Thus, even if the hypervisor 212 writes the same data before and after the VM 113A is shut down and the new guest VM is created, randomization of data will still be ensured because a new key is being used to decrypt the data. However, if VM 113A reboots (as opposed to being shut down), then no new encryption key is generated by processing device 123. Thus, if the hypervisor 212 writes the same data before and after the VM 113 is rebooted, the VM 113A may provide different addresses for each write as discussed herein. In some embodiments, because the VM 113A may be rebooted multiple times, the VM 113A may utilize a reboot counter, to determine when it is running out of encrypted memory page addresses to provide to the hypervisor. Upon reaching a threshold, the VM 113A may not send any memory page addresses to the hypervisor 212, and instead processor 123 may instruct the hypervisor 212 to zero-initialize all guest memory through a non-encrypted mapping. In this way, the VM 113A may still read the data as random.

Figure 5:
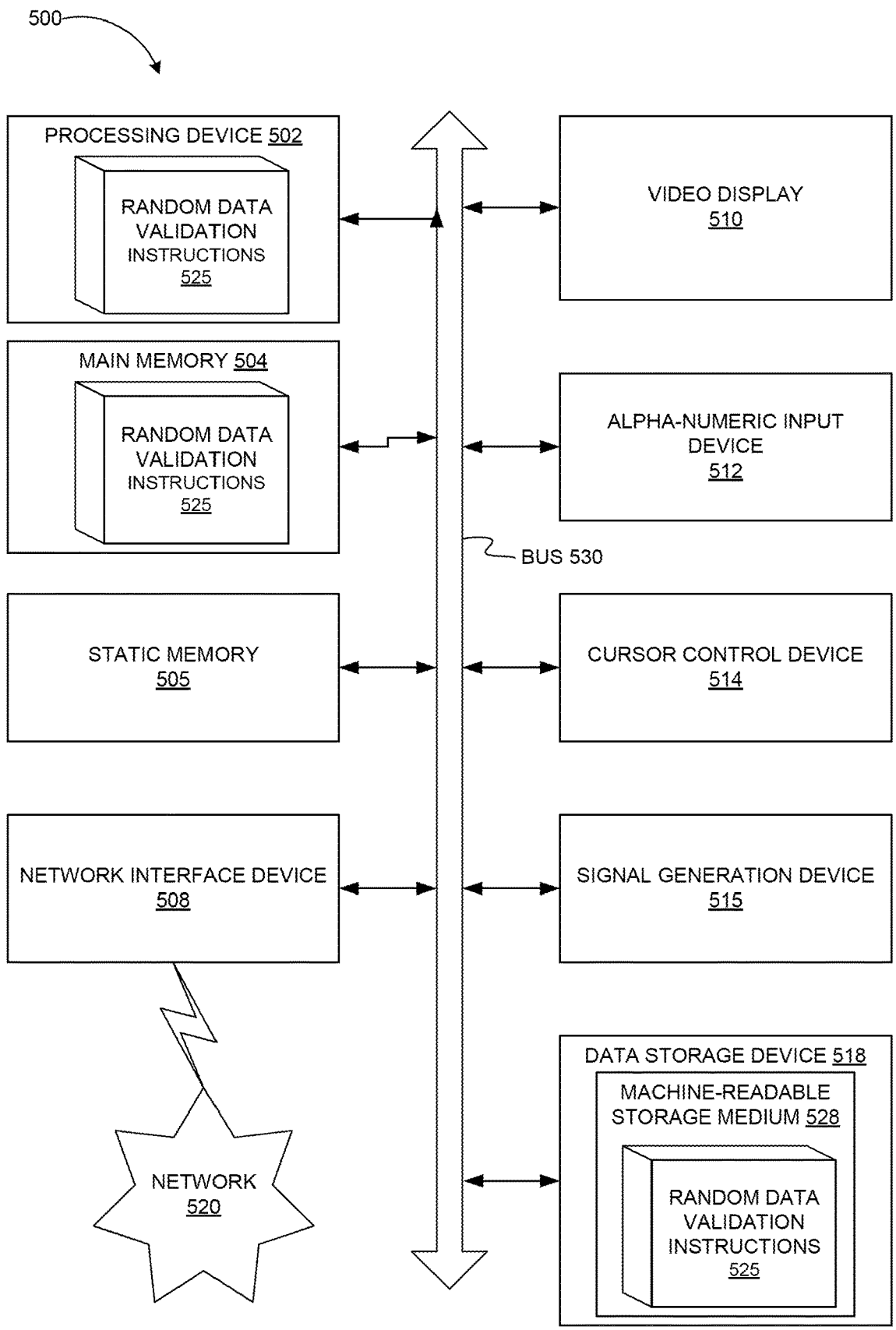
FIG. 5 is a block diagram of an example computing device that may perform one or more of the operations described herein, in accordance with some embodiments of the present disclosure.

FIG. 5 is a block diagram of an example computing device 500 that may perform one or more of the operations described herein, in accordance with some embodiments. For example, computing device 500 may transmit, to a guest operating system (OS) of a virtual machine (VM), an indication that a peripheral component interconnect (PCI) device connected to the VM has been disconnected such that the PCI device appears disconnected to a PCI port driver of the guest OS and simultaneously communicates with a device driver of the guest OS. In this way, while the PCI port driver (and as a result, the guest OS) may assume that the PCI device has been removed, the device driver may not crash as it may still communicate with the PCI device. Because the guest OS assumes the PCI device has been disconnected from the VM, it may wish for the device driver to release resources allocated to the PCI device and thus computing device 500 may transmit a device removal request to the device driver. The removal request may be transmitted to the device driver without the delay associated with the "push button" approach to device removal since the guest OS already believes the PCI device has been disconnected from the VM. The computing device may perform a graceful removal of the device driver and disconnect the PCI device from the VM.

Computing device 500 may be connected to other computing devices in a LAN, an intranet, an extranet, and/or the Internet. The computing device may operate in the capacity of a server machine in client-server network environment or in the capacity of a client in a peer-to-peer network environment. The computing device may be provided by a personal computer (PC), a set-top box (STB), a server, a network router, switch or bridge, or any machine capable of executing a set of instructions (sequential or otherwise) that specify actions to be taken by that machine. Further, while only a single computing device is illustrated, the term "computing device" shall also be taken to include any collection of computing devices that individually or jointly execute a set (or multiple sets) of instructions to perform the methods discussed herein.

The example computing device 500 may include a processing device (e.g., a general purpose processor, a PLD, etc.) 502, a main memory 504 (e.g., synchronous dynamic random access memory (DRAM), read-only memory (ROM)), a static memory 506 (e.g., flash memory and a data storage device 518), which may communicate with each other via a bus 530.

Processing device 502 may be provided by one or more general-purpose processing devices such as a microprocessor, central processing unit, or the like. In an illustrative example, processing device 502 may comprise a complex instruction set computing (CISC) microprocessor, reduced instruction set computing (RISC) microprocessor, very long instruction word (VLIW) microprocessor, or a processor implementing other instruction sets or processors implementing a combination of instruction sets. Processing device 502 may also comprise one or more special-purpose processing devices such as an application specific integrated circuit (ASIC), a field programmable gate array (FPGA), a digital signal processor (DSP), network processor, or the like. The processing device 502 may be configured to execute the operations described herein, in accordance with one or more aspects of the present disclosure, for performing the operations and steps discussed herein.

Computing device 500 may further include a network interface device 508 which may communicate with a network 520. The computing device 500 also may include a video display unit 510 (e.g., a liquid crystal display (LCD) or a cathode ray tube (CRT)), an alphanumeric input device 512 (e.g., a keyboard), a cursor control device 514 (e.g., a mouse) and an acoustic signal generation device 516 (e.g., a speaker). In one embodiment, video display unit 510, alphanumeric input device 512, and cursor control device 514 may be combined into a single component or device (e.g., an LCD touch screen).

Data storage device 518 may include a computer-readable storage medium 528 on which may be stored one or more sets of random data validation instructions 525, e.g., instructions for carrying out the operations described herein, in accordance with one or more aspects of the present disclosure. Random data validation instructions 525 may also reside, completely or at least partially, within main memory 504 and/or within processing device 502 during execution thereof by computing device 500, main memory 504 and processing device 502 also constituting computer-readable media. The random data validation instructions 525 may further be transmitted or received over a network 520 via network interface device 508.

While computer-readable storage medium 528 is shown in an illustrative example to be a single medium, the term "computer-readable storage medium" should be taken to include a single medium or multiple media (e.g., a centralized or distributed database and/or associated caches and servers) that store the one or more sets of instructions. The term "computer-readable storage medium" shall also be taken to include any medium that is capable of storing, encoding or carrying a set of instructions for execution by the machine and that cause the machine to perform the methods described herein. The term "computer-readable storage medium" shall accordingly be taken to include, but not be limited to, solid-state memories, optical media and magnetic media.

Unless specifically stated otherwise, terms such as "receiving," "routing," "updating," "providing," or the like, refer to actions and processes performed or implemented by computing devices that manipulates and transforms data represented as physical (electronic) quantities within the computing device's registers and memories into other data similarly represented as physical quantities within the computing device memories or registers or other such information storage, transmission or display devices. Also, the terms "first," "second," "third," "fourth," etc., as used herein are meant as labels to distinguish among different elements and may not necessarily have an ordinal meaning according to their numerical designation.

Examples described herein also relate to an apparatus for performing the operations described herein. This apparatus may be specially constructed for the required purposes, or it may comprise a general purpose computing device selectively programmed by a computer program stored in the computing device. Such a computer program may be stored in a computer-readable non-transitory storage medium.

The methods and illustrative examples described herein are not inherently related to any particular computer or other apparatus. Various general purpose systems may be used in accordance with the teachings described herein, or it may prove convenient to construct more specialized apparatus to perform the required method steps. The required structure for a variety of these systems will appear as set forth in the description above.

The above description is intended to be illustrative, and not restrictive. Although the present disclosure has been described with references to specific illustrative examples, it will be recognized that the present disclosure is not limited to the examples described. The scope of the disclosure should be determined with reference to the following claims, along with the full scope of equivalents to which the claims are entitled.

As used herein, the singular forms "a", "an" and "the" are intended to include the plural forms as well, unless the context clearly indicates otherwise. It will be further understood that the terms "comprises", "comprising", "includes", and/or "including", when used herein, specify the presence of stated features, integers, steps, operations, elements, and/or components, but do not preclude the presence or addition of one or more other features, integers, steps, operations, elements, components, and/or groups thereof. Therefore, the terminology used herein is for the purpose of describing particular embodiments only and is not intended to be limiting.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Although the method operations were described in a specific order, it should be understood that other operations may be performed in between described operations, described operations may be adjusted so that they occur at slightly different times or the described operations may be distributed in a system which allows the occurrence of the processing operations at various intervals associated with the processing.

Various units, circuits, or other components may be described or claimed as "configured to" or "configurable to" perform a task or tasks. In such contexts, the phrase "configured to" or "configurable to" is used to connote structure by indicating that the units/circuits/components include structure (e.g., circuitry) that performs the task or tasks during operation. As such, the unit/circuit/component can be said to be configured to perform the task, or configurable to perform the task, even when the specified unit/circuit/component is not currently operational (e.g., is not on). The units/circuits/components used with the "configured to" or "configurable to" language include hardware—for example, circuits, memory storing program instructions executable to implement the operation, etc. Reciting that a unit/circuit/component is "configured to" perform one or more tasks, or is "configurable to" perform one or more tasks, is expressly intended not to invoke 35 U.S.C. 112, sixth paragraph, for that unit/circuit/component. Additionally, "configured to" or "configurable to" can include generic structure (e.g., generic circuitry) that is manipulated by software and/or firmware (e.g., an FPGA or a general-purpose processor executing software) to operate in manner that is capable of performing the task(s) at issue. "Configured to" may also include adapting a manufacturing process (e.g., a semiconductor fabrication facility) to fabricate devices (e.g., integrated circuits) that are adapted to implement or perform one or more tasks. "Configurable to" is expressly intended not to apply to blank media, an unprogrammed processor or unprogrammed generic computer, or an unprogrammed programmable logic device, programmable gate array, or other unprogrammed device, unless accompanied by programmed media that confers the ability to the unprogrammed device to be configured to perform the disclosed function(s).

The foregoing description, for the purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the embodiments and its practical applications, to thereby enable others skilled in the art to best utilize the embodiments and various modifications as may be suited to the particular use contemplated. Accordingly, the present embodiments are to be considered as illustrative and not restrictive, and the invention is not to be limited to the details given herein, but may be modified within the scope and equivalents of the appended claims.

What is claimed is:
1. A method comprising:
generating, by a virtual device executing on a hypervisor, data intended for a virtual machine (VM) having a guest memory that includes one or more encrypted pages and one or more unencrypted pages, wherein information written to an encrypted page of the guest memory by the VM is encrypted using an encryption key assigned to the VM and information read from the encrypted page by the VM is decrypted using the encryption key assigned to the VM;
writing, by a processing device, the data to an encrypted page of the guest memory using the hypervisor so that the data is not encrypted by the encryption key assigned to the VM; and
reading, by the VM, the data from the encrypted page as random data;
receiving one or more additional requests from the hypervisor to write data in the guest memory of the VM, and for each of the one or more additional requests, pro- viding the hypervisor a different encrypted page of the one or more encrypted pages in which to write the data of the request;

determining whether a threshold number of the one or more additional requests from the hypervisor have duplicative data; and responsive to a threshold number of the one or more additional requests having duplicative data, denying the hypervisor access to the guest memory.

2. The method of claim 1, wherein reading the data from the encrypted page comprises improperly decrypting the data using the encryption key assigned to the VM, thereby randomizing the data.

3. The method of claim 1, wherein writing the data to the encrypted page of guest memory comprises encrypting the data using an encryption key of the hypervisor.

4. The method of claim 1, wherein the virtual device is an entropy source.

5. The method of claim 1, wherein the data comprises predictable data.

6. A system comprising:

a memory; and a processing device operatively coupled to the memory, the processing device to:

generate, by a virtual device executing on a hypervisor, data intended for a virtual machine (VM) having a guest memory that includes one or more encrypted pages and one or more unencrypted pages, wherein information written to an encrypted page of the guest memory by the VM is encrypted using an encryption key assigned to the VM and information read from the encrypted page by the VM is decrypted using the encryption key assigned to the VM;

write the data to an encrypted page of the guest memory using the hypervisor so that the data is not encrypted by the encryption key assigned to the VM;

read, by the VM, the data from the encrypted page as random data;

receive one or more additional requests from the hypervisor to write data in the guest memory of the VM, and for each of the one or more additional requests, provide the hypervisor a different encrypted page of the one or more encrypted pages in which to write the data of the request;

determine whether a threshold number of the one or more additional requests from the hypervisor have duplicative data; and responsive to a threshold number of the one or more additional requests having duplicative data, deny the hypervisor access to the guest memory.

7. The system of claim 6, wherein to read the data from the encrypted page, the processing device is to improperly decrypt the data using the encryption key assigned to the VM, thereby randomizing the data.

8. The system of claim 6, wherein to write the data to the encrypted page of guest memory using the hypervisor, the processing device is to encrypt the data using an encryption key of the hypervisor.

9. The system of claim 6, wherein the virtual device is an entropy source.

10. The system of claim 6, wherein the data comprises predictable data.

11. A non-transitory computer readable medium, having instructions stored thereon that, when executed by a processing device, cause the processing device to:

generate, by a virtual device executing on a hypervisor, data intended for a virtual machine (VM) having a guest memory that includes one or more encrypted pages and one or more unencrypted pages, wherein information written to an encrypted page of the guest memory by the VM is encrypted using an encryption key assigned to the VM and information read from the encrypted page by the VM is decrypted using the encryption key assigned to the VM;

write, by the processing device, the data to an encrypted page of the guest memory using the hypervisor so that the data is not encrypted by the encryption key assigned to the VM;

read, by the VM, the data from the encrypted page as random data;

receive one or more additional requests from the hypervisor to write data in the guest memory of the VM, and for each of the one or more additional requests, provide the hypervisor a different encrypted page of the one or more encrypted pages in which to write the data of the request;

determine whether a threshold number of the one or more additional requests from the hypervisor have duplicative data; and responsive to a threshold number of the one or more additional requests having duplicative data, deny the hypervisor access to the guest memory.

12. The non-transitory computer readable medium of claim 11, wherein to read the data from the encrypted page, the processing device is to improperly decrypt the data using the encryption key assigned to the VM, thereby randomizing the data.

13. The non-transitory computer readable medium of claim 11, wherein to write the data to the encrypted page of guest memory using the hypervisor, the processing device is to encrypt the data using an encryption key of the hypervisor.

14. The non-transitory computer readable medium of claim 11, wherein the virtual device is an entropy source.

* * * * *